United States Patent [19]

Tsukagoshi et al.

[11] 4,404,315
[45] Sep. 13, 1983

[54] MOLDING COMPOSITIONS AND DIAPHRAGMS, ARM PIPES AND HEAD SHELLS MOLDED THEREFROM

[75] Inventors: Tsunehiro Tsukagoshi; Etsuro Nemoto; Shinichi Yokozseki; Sumio Hagiwara; Toshikazu Yoshino; Yasuyuki Arai, all of Ohmori-nishi; Kazuyoshi Kobayashi, Tokorozawa, all of Japan

[73] Assignee: Pioneer Electronic Corporation, Tokyo, Japan

[21] Appl. No.: 147,866

[22] Filed: May 8, 1980

[30] Foreign Application Priority Data

May 28, 1979 [JP] Japan ................................ 54-06949
May 5, 1979 [JP] Japan ................................ 54-069409
Jun. 5, 1979 [JP] Japan ................................ 54-069410
Jun. 5, 1979 [JP] Japan ................................ 54-069412

[51] Int. Cl.$^3$ ..................... C08L 31/04; C08L 35/04; C08L 27/04
[52] U.S. Cl. ..................... 524/521; 524/524; 524/527; 524/495; 524/496
[58] Field of Search ..................... 260/42.49; 252/511; 274/23 R; 181/167; 428/402, 522; 525/239, 238; 524/495, 496, 521, 524, 527

[56] References Cited

U.S. PATENT DOCUMENTS

| | | | |
|---|---|---|---|
| 2,550,139 | 4/1951 | Daly | 524/521 |
| 3,275,716 | 9/1966 | Wiggins | 525/239 |
| 3,316,327 | 4/1967 | Baer et al. | 525/238 |
| 3,399,103 | 8/1968 | Salyer et al. | 260/42.49 |
| 3,399,104 | 8/1968 | Ball et al. | 260/42.49 |
| 3,419,511 | 12/1968 | Condo et al. | 524/521 |
| 3,642,954 | 2/1972 | Turner | 524/521 |
| 4,088,625 | 5/1978 | Gubisch et al. | 260/42.49 |
| 4,173,596 | 11/1979 | DeWitt | 525/238 |
| 4,259,460 | 3/1981 | Schwarz | 525/238 |

*Primary Examiner*—Lewis T. Jacobs
*Attorney, Agent, or Firm*—Armstrong, Nikaido, Marmelstein & Kubovcik

[57] ABSTRACT

A molding composition is obtained by blending flaky graphite with a resin component comprising a mixture of a thermoplastic resin having a glass transition temperature higher than room temperature and another thermoplastic resin having a glass transition temperature lower than room temperature. The composition is kneaded and rolled into a sheet to orient the graphite flakes parallel to the surface of the sheet. The rolled sheet is then molded into an article, for example, speaker diaphragm, arm pipe and head shell, which may be optionally be carbonized or graphitized. The resulting article exhibits improved physical properties, especially high specific modulus of elasticity comparable to aluminum and beryllium as well as good internal loss comparable to paper.

5 Claims, 12 Drawing Figures

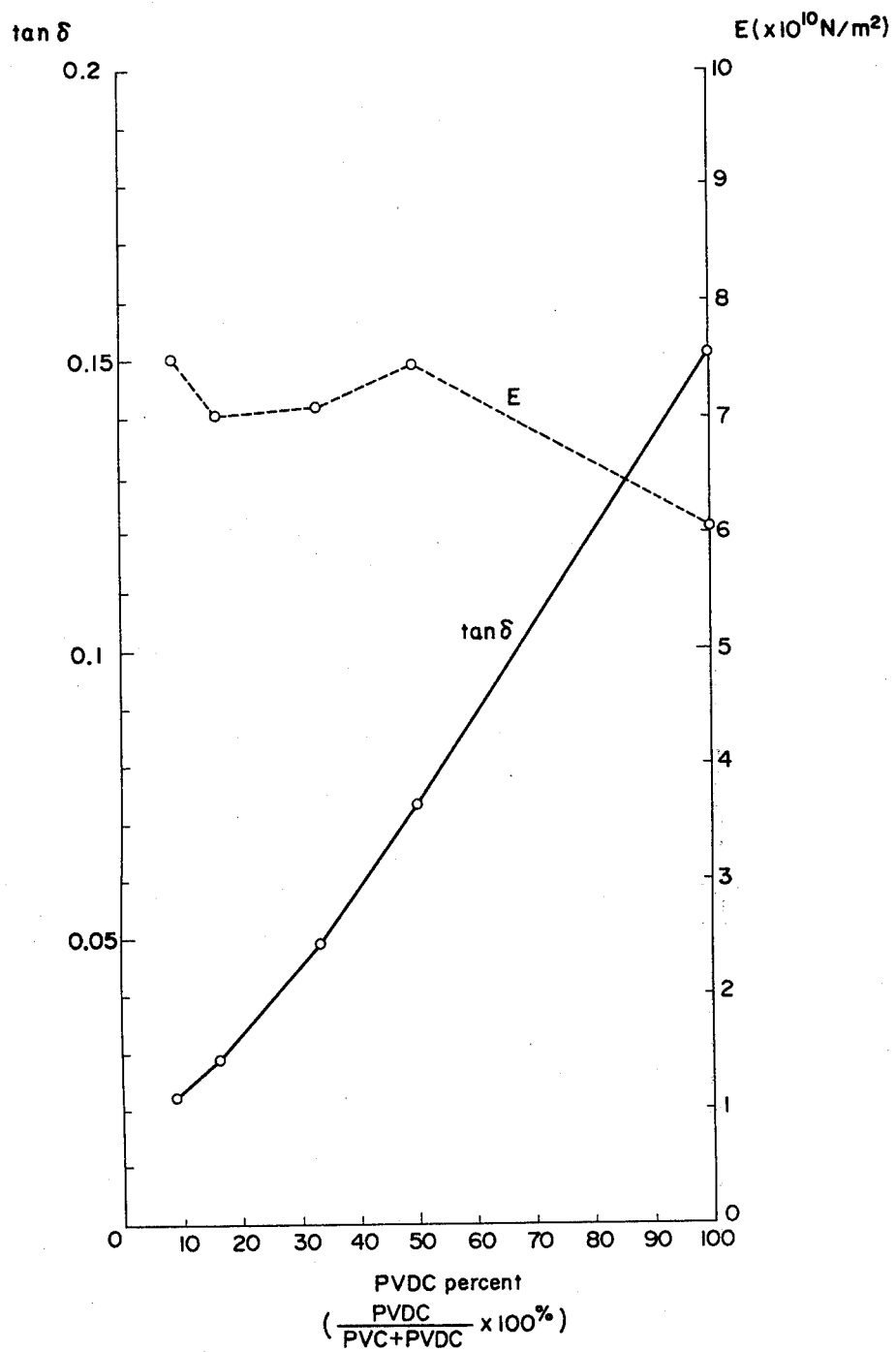

4,404,315

MOLDING COMPOSITIONS AND DIAPHRAGMS, ARM PIPES AND HEAD SHELLS MOLDED THEREFROM

BACKGROUND OF THE INVENTION

This invention relates to molding compositions and articles made therefrom. More particularly, this invention relates to molding compositions comprising a thermoplastic resin and graphite. Such compositions may be suitably molded into acoustic articles such as diaphragms, arm pipes, head shells, cantilevers or the like. This invention also relates to such moldings.

For the fabrication of elements used in vibration systems in acoustic instruments, for example, diaphragms, head shells, tone arms, cantilevers and the like, materials are required having such properties as light weight, high stiffness and high elasticity. Addition of high internal loss to this list of properties is desirable. In the case of speaker diaphragms, light weight and increased stiffness enable the diaphragms to reproduce sound up to a higher frequency range without partial vibration. Internal loss should be high enough to prevent the rapid rise of sound pressure around resonance frequencies and to improve damping characteristics. In the cases of vibration system elements, for example, head shells, tone arms, cantilevers or the like, it is required to reduce the equivalent mass at a stylus tip as low as possible. This means that materials should have light weight, high stiffness and high elasticity to ensure a sufficient mechanical strength at a reduced wall thickness. Internal loss should also be high enough to accomodate partial vibration.

Known light weight, high elasticity materials are metals such as aluminum, titanium and beryllium, and composite materials such as carbon fiber reinforced plastics and graphite in synthetic resins. Particularly, these metals have been used to mold diaphragms and head shells but they are very poor in internal loss. Materials known of their high internal loss are paper, synthetic resins and their composite materials. However, these materials have a low elasticity and hence, a low specific modulus of elasticity $E/\rho$. There is a need for light weight, high elasticity, high internal loss materials.

The inventors previously proposed diaphragms, arm pipes and head shells made from a kneaded mixture of flaky graphite and a high molecular compound. Articles molded from such compositions, surface oxidized articles and carbonized articles are disclosed in U.S. Ser. Nos. 968,912 (filed Dec. 13, 1978), 35,425 (filed June 29, 1979), 63,531 (filed Aug. 3, 1979), 53,532 (filed Aug. 3, 1979), and 78,045 (filed Sept. 24, 1979). These materials are relatively light weight and have a high modulus of elasticity and a high internal loss. Diaphragms, arm pipes and head shells made therefrom show good properties for their purposes.

SUMMARY OF THE INVENTION

An object of this invention is to improve the previously proposed compositions and to provide a molding composition which has further improved modulus of elasticity and internal loss when molded into acoustic articles such as diaphragms, arm pipes, head shells, cantilevers, cartridge bodies, speaker cabinets, speaker horns, and turn table housings.

Another object of this invention is to provide improved diaphragms, arm pipes and head shells moulded from the above composition.

The inventors have found that molding compositions comprising flaky graphite powder and a thermoplastic resin can be further improved in physical properties by using a thermoplastic resin having a glass transition temperature Tg higher than room temperature, i.e., 20° C. and another thermoplastic resin having a glass transition temperature lower than room temperature as resin components.

In general, high molecular weight material has a tendency of reducing its elasticity and showing a rapid rise of internal loss as the ambient temperature exceeds its glass transition temperature. When a mixture of a thermoplastic resin having a high Tg and another thermoplastic resin having a low Tg is combined with graphite, the internal loss of articles molded therefrom may be controlled by changing the relative proportion of the two different resins. The terms "high Tg" and "low Tg" used herein designate glass transition temperatures higher and lower than room temperature, respectively.

Examples of the high Tg thermoplastic resins are polyvinyl chloride (PVC), a vinyl chloride-vinyl acetate copolymer, a vinyl chloride-acrylonitrile copolymer and similar homopolymers and copolymers. Examples of the low Tg thermoplastic resins are polyvinylidene chloride (PVDC), a vinylidene chloride-vinyl chloride copolymer, a vinylidene chloride-acrylonitrile copolymer and similar homopolymers and copolymers.

Graphite powder is of flake type having the shape of a disc with a relatively large diameter and a small thickness. Preferably, graphite flakes have an average grain size of about 20 microns or less, most preferably of about 5 microns or less. Orientation of graphite flakes in a resinous matrix greatly improves elasticity. Graphite flakes may be readily oriented by rolling a mixture of graphite flakes and resin components before it is molded into an article.

A substantial improvement is achieved when 10–90 weight % of flaky graphite is mixed with 90–10 weight % of the resin combination. This blending proportion ensures the moldability of the resulting compositions and does not cause embrittlement of moldings. Most preferably, 50–75 weight % of flaky graphite is mixed with 50–25 weight % of the resin combination. The weight ratio of high Tg resin to low Tg resin may vary within a wide range depending on the desired properties of a final product. The resins may be admixed with flaky graphite using a kneader or a roll at an elevated temperature above the softening temperatures of the resins, generally, at a temperature of 130°–200° C. A well-known plasticizer and/or stabilizer may optionally be added during kneading. Rolling of a mixture results in a sheet-like material. Since graphite flakes are oriented in parallel with the main surface of the sheet as a result of rolling, this sheet has a high modulus of elasticity.

Orientation of graphite flakes in parallel with the main surface of moldings is essential to obtain an increased modulus of elasticity. In molding a mixture of graphite and different resins, a molding method capable of facilitating orientation of graphite flakes should be employed. In a preferred embodiment, a kneaded mixture of graphite in molten different resins may be rolled into a sheet in which graphite flakes are oriented in parallel with the main surface of the sheet before the sheet is molded into a desired article by vacuum forming or air-pressure forming. In another embodiment, a kneaded mixture of graphite and at least two resins may be directly molded into a desired shape by press molding or other well-known molding techniques insofar as some care is taken so as to impart a degree of orientation to graphite flakes. This direct molding may be used when a final product is not required to have an exceptionally high modulus of elasticity.

BRIEF DESCRIPTION OF THE DRAWINGS

The invention will be described by referring to the accompanying drawings in which:

FIG. 12 illustrates the relationships of modulus of elasticity and internal loss to PDVC percent added.

DESCRIPTION OF THE PREFERRED EMBODIMENTS

Figure 1:
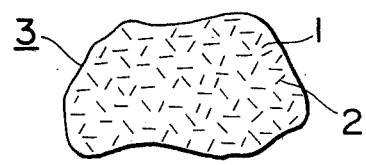
FIG. 1 is a cross-sectional view of a mass of resinous components in admixture with graphite.

The molding composition according to the present invention may be prepared by adding an amount of graphite flake to a combination of high Tg and low Tg resins. A suitable plasticizer and/or stabilizer may be optionally added to the mixture. The mixture is kneaded by means of a kneader or roll while it is heated at a temperature capable of softening the resins, generally at a temperature of 130°–200° C. As shown in FIG. 1, a resinous matrix 1 contains graphite flakes 2 in a random fashion to form a mass 3. Head shells, pickup cartridge bodies or the like may be directly fabricated from this kneaded mass by compression molding or pressure molding.

Figure 2:
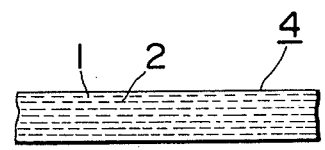
FIG. 2 is a cross-sectional view of a sheet prepared by rolling the mass shown in FIG. 1.

The kneaded mass is then rolled into a sheet 4 as shown in FIG. 2. Rolling causes the graphite flakes 2 to orient in parallel with the surface of the sheet 4, thereby increasing the modulus of elasticity and stiffness of the sheet. This sheet is a starting material from which a diaphragm, head shell, arm pipe, speaker cabinet, speaker horn or turntable housing may be fabricated by vacuum forming or pressure forming.

Figure 3:
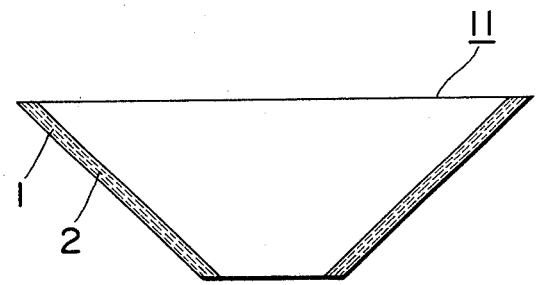
FIG. 3 is a cross-sectional view of a diaphragm molded from the sheet shown in FIG. 2 according to this invention.

A diaphragm 11 as shown in FIG. 3 may be obtained from the sheet 4 by any suitable molding process, for example, by vacuum forming or pressure forming. In FIG. 3, the diaphragm 11 is shown as having a cone shape. The sheet may also be molded into a dome-shaped diaphragm. Molding is preferably effected at a temperature of 70°–150° C. or near the softening points of the resins.

Figure 4:
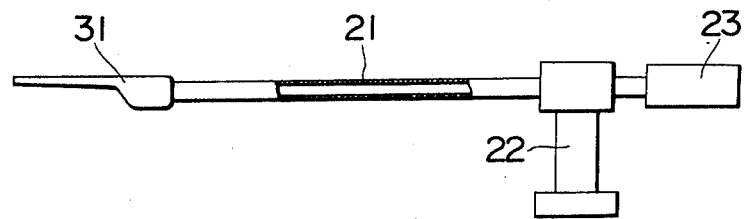
FIG. 4 is a schematic view of a tone arm system.

FIG. 4 is a schematic view of a tonearm system. An arm pipe 21 is pivoted by a fulcrum 22 and has at the rear end a counterweight 23 movably mounted and at the front end a head shell 31 fixedly mounted thereon.

Figure 5:
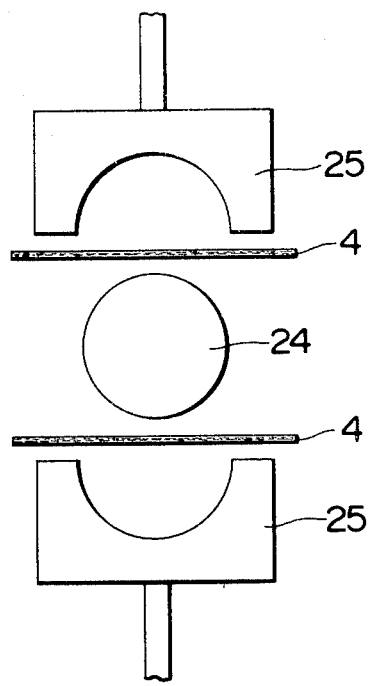
FIG. 5 is an exploded view of a mold for molding an arm pipe from two sheets.
Figure 6:
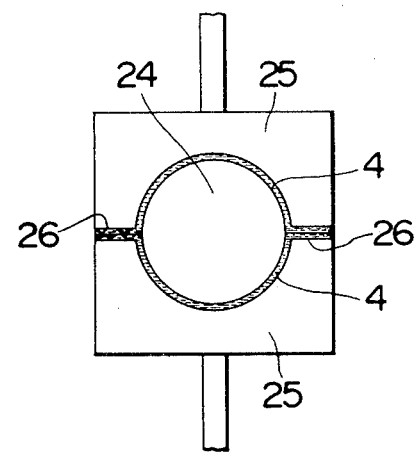
FIG. 6 is a cross-section of the mold during molding.
Figure 7:
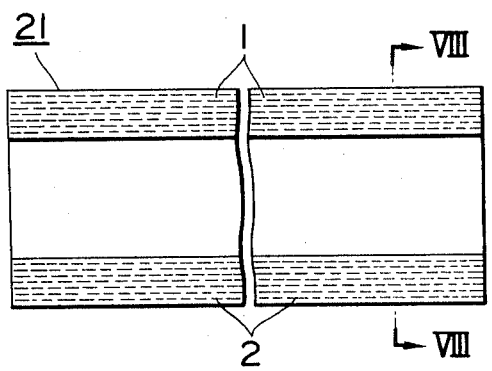
FIG. 7 is an axial cross-section of an arm pipe according to this invention.
Figure 8:
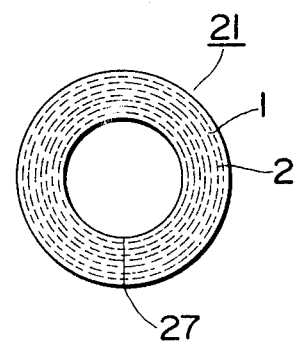
FIG. 8 is a cross-section of the arm pipe taken along line VIII—VIII in FIG. 7.

The arm pipe 21 may be prepared from the above-rolled sheet 4. As shown in FIG. 5, two sheets 3 are placed between a cylindrical core 24 and upper and lower mold halves 25 and 25 each having a semi-spherical molding cavity matching the cylindrical surface of the core. The mold halves 25 at a temperature, usually between 70° C. and 150° C. are pressed against each other as shown in FIG. 6. After this heat molding, excessive fins 26 are cut off and the core 24 is withdrawn, thereby obtaining a cylindrical hollow pipe. Alternatively, the rolled sheet 4 is rounded into a hollow pipe and the adjoining side edges are bonded to each other at an interface 27 by heatbonding or with an adhesive as shown in FIGS. 7 and 8. In either case, graphite flakes 2 are oriented axially or in parallel with the surface of the resultant arm pipe 21, and uniformly distributed throughout the resinous matrix 1.

Figure 9:
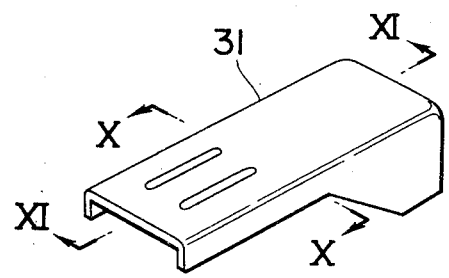
FIG. 9 is a perspective view of a head shell.
Figure 10:
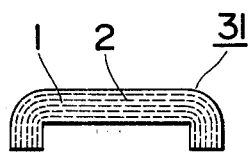
FIGS. 10 and 11 are cross-sectional views of the head shell taken aong lines X—X and XI—XI in FIG. 9, respectively.
Figure 11:
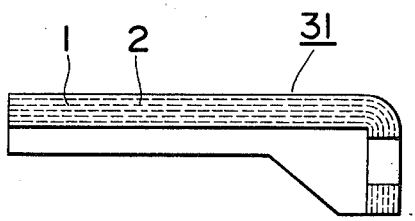

The head shell 31 is also fabricated from the above rolled sheet 4 by any suitable molding process, for example, by vacuum forming or pressure forming. FIGS. 9, 10 and 11 show that graphite flakes 2 are oriented in parallel with the surface of the resultant head shell 31. Uniform distribution of graphite flakes 2 in the resinous matrix 1 is also depicted. Two or more rolled sheets 4 can be laminated prior to molding into a shell shape. Alternatively, the head shell 31 may be fabricated from the kneaded mass by compression or press molding. In the alternative case, graphite flakes are uniformly distributed in the resinous matrix, but the graphite flakes are oriented to a lesser extent.

The diaphragm 11, arm pipe 21, and head shell 31 may be subjected to carbonization or graphitization to increase their stiffness.

For example, the diaphragm is placed in a matching support to prevent the diaphragm from being deformed in the subsequent heat treatment. The diaphragm held by the support is then gradually heated in an oxidizing atmosphere, for example, in air to a temperature of 250°–350° C. at a rate of 1°–10° C./hour to effect pre-sintering. The diaphragm is oxidized at its surface and rendered infusible during this pre-sintering. The infusible diaphragm may be carbonized by heating it in a nonoxidizing atmosphere or in vacuum to a temperature of 1000°–1500° C. at a rate of 10°–20° C./hour. Graphitization may be achieved by heating the infusible diaphragm to a temperature of 2000°–3000° C. under similar conditions as used in the carbonization treatment. It will be understood that the arm pipe and head shell may be carbonized or graphitized in the same manner as the diaphragm. Carbonization and graphitization serve to increase the modulus of elasticity of a shaped article.

The following examples are illustrative of the present invention, but not construed as limiting the invention thereto.

EXAMPLE 1

Molding compositions of graphite and resin combinations are prepared. For the resin combination, a vinyl chloride-vinyl acetate copolymer (to be referred to as "PVC" in this Example for simplicity) is used as a high Tg resin and a vinylidene chloride-acrylonitrile copolymer (to be referred to as "PVDC") is used as a low Tg resin. These two resins are combined in varying amounts. The various resin combinations are mixed with flaky graphite at a fixed weight ratio of 1:2, and a plasticizer and a stabilizer well-known in the art are added in standard amounts.

|  | Parts by weight |
| --- | --- |
| Graphite | 100 |
| Resin combination | 50 |
| Plasticizer (BPBG) | 5 |
| Stabilizer (lead stearate) | 1 |

The resulting mixtures are kneaded at 150° C. and then rolled into sheets. The modulus of elasticity and internal loss of the sheets are determined. Young's modulus is measured at a frequency of 500 Hz. The measured values are plotted in relation to percents of PVDC added, i.e., PVDC/(PVC+PVDC)×100%. FIG. 12 shows how the modulus of elasticity and internal loss of sheets vary as the ratio of the different resins changes. As seen from FIG. 12, the modulus of elasticity E designated by broken lines does not show a significant change with increased PVDC percents, but the internal loss, tan δ, designated by solid lines shows a steep rise in proportion to an increase of the PVDC percent.

These materials have a density $\rho$ of approximately 1.84 g/cm$^3$,

EXAMPLE 2

A sheet sample prepared and rolled according to the procedure of Example 1 is carbonized by heating it in an oxidizing atmosphere to a temperature of about 300° C. at a rate of 1°–10° C./hour to render it infusible and then heating in a non-oxidizing atmosphere to a temperature of about 1,200° C. at a rate of 10°–20° C./hour.

EXAMPLE 3

Another rolled sheet sample is rendered infusible in the same manner as above and then heated in a nonoxidizing atmosphere to a temperature of about 2,500° C. at a rate of 10°–20° C. A graphitized sample is obtained.

The physical properties of a typical material having the formulation as indicated in Example 1 and containing a resin combination of 30 wt. % PVDC and 70 wt. % PVC are measured after molding (Example 1), carbonization (Example 2) and graphitization (Example 3).

The results are shown in Table 1 together with properties of conventionally used materials.

TABLE 1

|  | Modulus of elasticity E ($\times 10^{10}$ N/m) | Density (kg/m$^3$) | Specific modulus of elasticity $\sqrt{E/\rho}$ ($\times 10^3$ m/sec) | Internal loss tan δ |
| --- | --- | --- | --- | --- |
| Example 1 | 7.0 | 1840 | 6.2 | 0.05 |
| Example 2 | 12.5 | 1790 | 8.4 | 0.02 |
| Example 3 | 18.0 | 1790 | 10.0 | 0.01 |
| Aluminum | 7.1 | 2690 | 5.1 | 0.003 |
| Titanium | 11.9 | 4390 | 5.2 | 0.003 |
| Beryllium | 23.0 | 1800 | 11.3 | 0.005 |
| Kraft paper | 0.2 | 570 | 1.9 | 0.08 |

The results of Table 1 show that the addition and orientation of graphite flakes to a resinous material provides an increased modulus of elasticity and the presence of a low Tg resin component contributes to an increased internal loss while the resultant composite materials are of light weight because of the components. When compared with metals like aluminum and titanium, the molding compositions of the present invention provide a comparable modulus of elasticity and ten times or more higher values of internal loss. Carbonization and graphitization can further improve the modulus of elasticity of the materials to 1.8 and 2.5 times higher values of the initial value respectively, approaching the modulus of elasticity of beryllium. It should be noted that this increase of modulus of elasticity is achieved without the sacrifice of increased internal loss which is about 4 times higher than those of metals.

Although samples molded in the above Examples are diaphragms, it will be understood that arm pipes and head shells may also be molded in a similar manner with similar results.

As understood from the foregoing, the molding composition of the present invention, when molded with graphite flakes oriented parallel to the surface of a molded article, exhibits a lighter weight and a higher elasticity than metals like aluminum and titanium, and despite such increased elasticity, retains a high internal loss comparable to that of paper. These molding compositions are particularly suitable to fabricate diaphragms, head shells, tone arms, cantilevers and other acoustic elements requiring light weight and high elasticity as well as sufficient internal loss. It will be understood that depending on the final use of molding compositions, an optimum combination of modulus of elasticity and internal loss can be obtained by changing the ratio of a high Tg resin to a low Tg resin as well as the ratio of a resin mixture to graphite. These molding compositions have further advantages that they are formulated from inexpensive, commercially available materials and are easily molded by well-known processes. Importantly, improved properties as exemplified by light weight, increased modulus of elasticity and good internal loss additionally enable these molding compositions to be molded into speaker horns, speaker cabinets, acoustic lens, equalizers, speaker frames, turntable sheets and other structural elements in acoustic equipment.

What is claimed is:

1. A molding composition comprising 10–90% by weight of a thermoplastic resin mixture and 90–10% by weight of a flaky graphite, the resin mixture comprising a first thermoplastic resin having a glass transition temperature higher than room temperature and a second thermoplastic resin having a glass transition temperature lower than room temperature, said second resin being 10 to 50% by weight based on the total weight of said first and second thermoplastic resins, said first thermoplastic resin being selected from the group consisting of polyvinyl chloride, a vinyl chloride-vinyl acetate copolymer and a vinyl chloride-acrylonitrile copolymer, and said second thermoplastic resin being selected from the group consisting of polyvinylidene chloride, vinylidene chloride-vinyl chloride copolymer and a vinylidene chloride-acrylonitrile copolymer.

2. A molding composition comprising 10–90% by weight of a thermoplastic resin mixture and 90–10% by weight of flaky graphite, the resin mixture comprising a first thermoplastic resin having a glass transition temperature higher than room temperature and a second thermoplastic resin having a glass transition temperature lower than room temperature, each of said first and second thermoplastic resins being present in the mixture in amounts effective to improve the internal loss without decreasing the modulus of elasticity of said composition when molded, said first thermoplastic resin being selected from the group consisting of polyvinyl chloride, a vinyl chloride-vinyl acetate copolymer, and a vinyl chloride-acrylonitrile copolymer, and said second thermoplastic resin being selected from the group consisting of polyvinylidene chloride, a vinylidene chloride-vinyl chloride copolymer and a vinylidene chloride-acrylonitrile copolymer.

3. A molding composition according to claim 1 or 2 wherein the amounts of the resin mixture and the graphite are 25–75% and 75–50% by weight of the composition, respectively.

4. A molding composition according to claim 1 or 2 wherein the resin mixture comprises polyvinyl chloride and polyvinylidene chloride.

5. A molding composition according to claim 1 or 2 wherein the resin mixture comprises a vinyl chloride-vinyl acetate copolymer and a vinylidene chloride-acrylonitrile copolymer.

* * * * *